(12) United States Patent
Rawat

(10) Patent No.: US 8,760,978 B2
(45) Date of Patent: Jun. 24, 2014

(54) MAGNETIC RECORDING HEAD AND SYSTEM HAVING OPTICAL WAVEGUIDE CORE AND/OR CLADDING OF AN ALLOYED OXIDE MATERIAL

(75) Inventor: Vijay P. S. Rawat, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 267 days.

(21) Appl. No.: 13/311,397

(22) Filed: Dec. 5, 2011

(65) Prior Publication Data
US 2013/0142020 A1    Jun. 6, 2013

(51) Int. Cl.
*G11B 11/00* (2006.01)
(52) U.S. Cl.
USPC ...................................... 369/13.33
(58) Field of Classification Search
None
See application file for complete search history.

(56) References Cited

U.S. PATENT DOCUMENTS

| | | | |
|---|---|---|---|
| 6,999,384 | B2 | 2/2006 | Stancil et al. |
| 7,079,727 | B1 | 7/2006 | Little |
| 7,664,352 | B1 | 2/2010 | Okayama |
| 7,803,455 | B2 | 9/2010 | Taka et al. |
| 2008/0223714 | A1 | 9/2008 | Tilsch et al. |
| 2009/0097364 | A1 | 4/2009 | Tawa et al. |
| 2010/0123965 | A1 | 5/2010 | Lee et al. |
| 2011/0090770 | A1 | 4/2011 | Iwanabe et al. |
| 2011/0141861 | A1 | 6/2011 | Hirata et al. |
| 2011/0170381 | A1 | 7/2011 | Matsumoto |

FOREIGN PATENT DOCUMENTS

| | | |
|---|---|---|
| JP | 62073202 | 4/1987 |
| JP | 2111871 A | 4/1990 |
| JP | 2111872 A | 4/1990 |
| JP | 5157927 A | 6/1993 |

OTHER PUBLICATIONS

Kobayashi et al., "Refractive index and attenuation characteristics of Si02-Ta205 optical waveguide film," 1983 Optical Society of America, Oct. 1, 1983, vol. 22, No. 19, Applied Optics, pp. 3121-3127.
Tang et al., "Experimental study on intermediate and gradient index dielectric thin films by a novel reactive sputtering method," 1997 American Vacuum Society, Journal of Vacuum Science Technology A., vol. 15, No. 5, Sep./Oct. 1997, pp. 2670-2672.

*Primary Examiner* — Paul Huber
(74) *Attorney, Agent, or Firm* — Zilka-Kotab, PC

(57) ABSTRACT

An apparatus according to one embodiment includes a near field transducer positioned towards a media-facing surface side, a primary waveguide for delivering light to the near field transducer, a secondary waveguide positioned near the primary waveguide and configured for receiving light from a light source and transferring at least some of the light received thereby to the primary waveguide, and a gap layer positioned between the primary waveguide and the secondary waveguide, wherein the secondary waveguide includes an oxide of at least one of Ta, Ti, Zr, and Nb alloyed with an oxide of at least one of Si and Al. Additional embodiments are also disclosed.

25 Claims, 6 Drawing Sheets

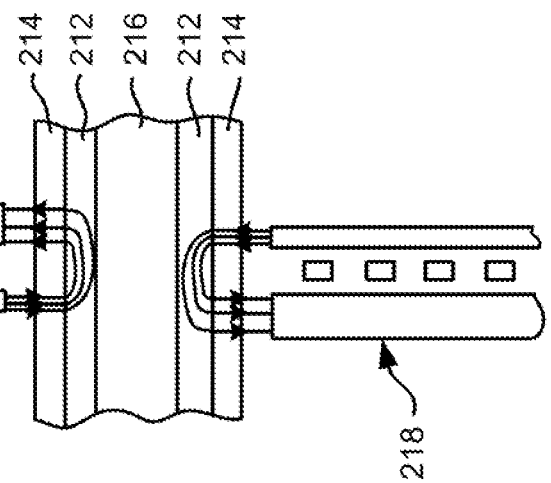
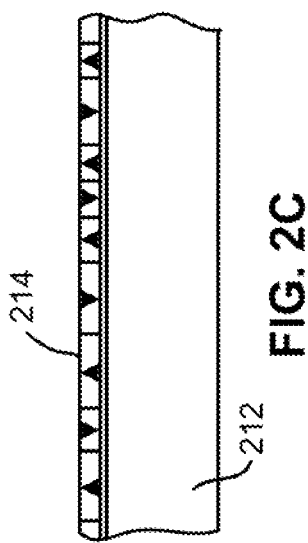
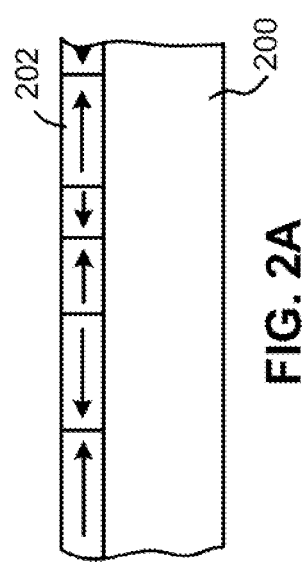
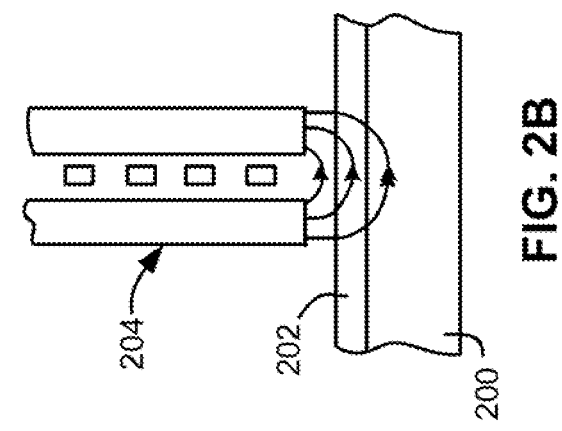
FIG. 2A
FIG. 2B
FIG. 2C
FIG. 2D
FIG. 2E

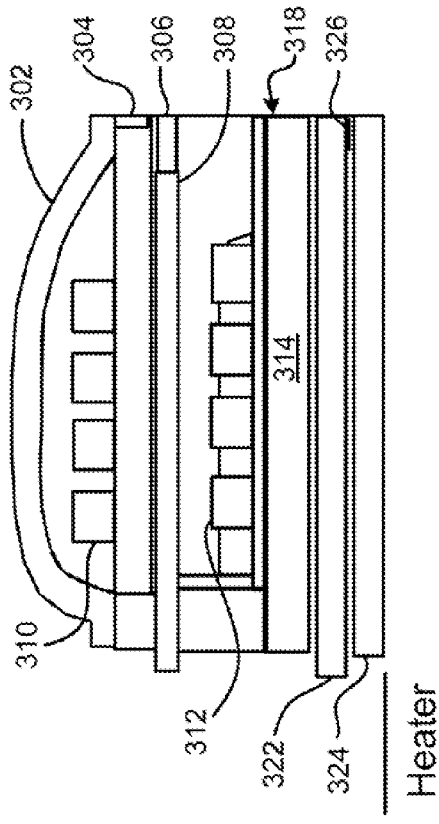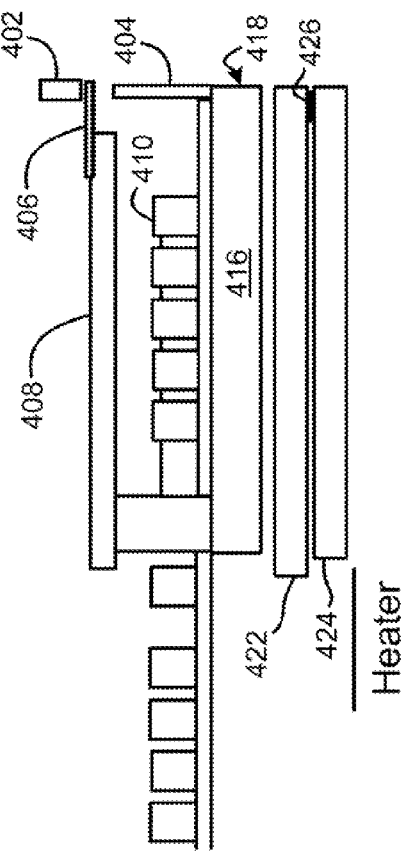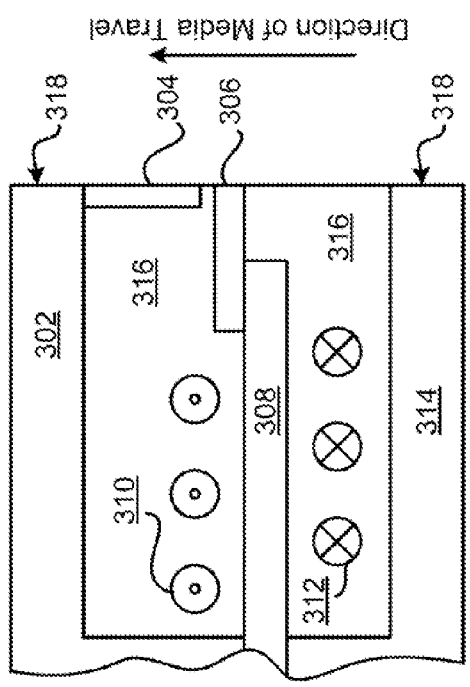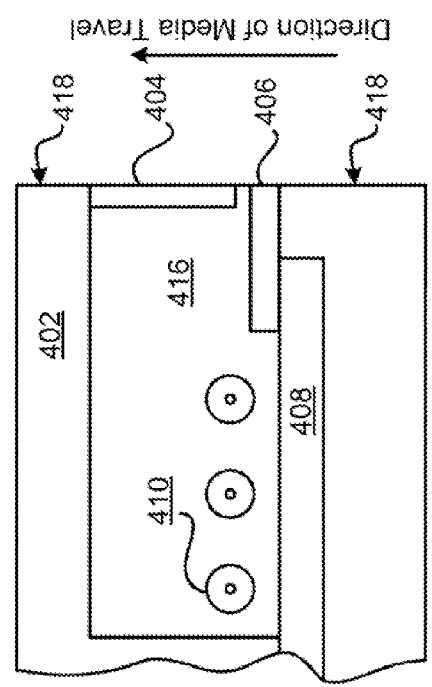

MAGNETIC RECORDING HEAD AND SYSTEM HAVING OPTICAL WAVEGUIDE CORE AND/OR CLADDING OF AN ALLOYED OXIDE MATERIAL

FIELD OF THE INVENTION

The present invention relates to data storage systems, and more particularly, this invention relates to write heads with near field transducers for thermally assisted recording.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface and writes data within this heated region. The data state becomes "fixed" upon cooling the media to ambient temperatures. This technique is broadly referred to as "thermally assisted (magnetic) recording", TAR or TAMR. It can be applied to both longitudinal and perpendicular recording systems, although the highest density state of the art storage systems are more likely to be perpendicular recording systems. Heating of the media surface has been accomplished by a number of techniques such as focused laser beams or near field optical sources.

U.S. Pat. No. 6,999,384 to Stancil et al., which is herein incorporated by reference, discloses near field heating of a magnetic medium.

What is needed is a way to further improve TAR systems.

SUMMARY

An apparatus according to one embodiment includes a near field transducer positioned towards a media-facing surface side; a primary waveguide for delivering light to the near field transducer; a secondary waveguide positioned near the primary waveguide and configured for receiving light from a light source and transferring at least some of the light received thereby to the primary waveguide; and a gap layer positioned between the primary waveguide and the secondary waveguide, wherein the secondary waveguide includes an oxide of at least one of Ta, Ti, Zr and NU alloyed with an oxide of at least one of Si and Al.

An apparatus according to one embodiment includes a near field transducer positioned towards a media-facing surface side; and a primary waveguide for illumination of the near field transducer, the primary waveguide including an oxide of at least one of Ta, Ti, Zr and Nb alloyed with an oxide of at least one of Si and Al.

In yet another embodiment, an apparatus includes a near field transducer positioned towards a first side and a primary waveguide for illumination of the near field transducer, the primary waveguide having a first end near a flex side and a second end near the near field transducer. The primary waveguide has a tapered shape such that a cross sectional area of the first end of the primary waveguide is less than a cross sectional area of the second end of the primary waveguide.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A shows a schematic representation in section of a recording medium utilizing a longitudinal recording format.

FIG. 2B shows a schematic representation of a conventional magnetic recording head and recording medium combination for longitudinal recording as in FIG. 2A.

FIG. 2C shows a magnetic recording medium utilizing a perpendicular recording format.

FIG. 2D shows a schematic representation of a recording head and recording medium combination for perpendicular recording on one side.

FIG. 2E shows a schematic representation of a recording apparatus adapted for recording separately on both sides of the medium.

FIG. 3A shows a cross-sectional view of one particular embodiment of a perpendicular magnetic head with helical coils.

FIG. 3B shows a cross-sectional view of one particular embodiment of a piggyback magnetic head with helical coils.

FIG. 4A shows a cross-sectional view of one particular embodiment of a perpendicular magnetic head with looped coils.

FIG. 4B shows a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meaning implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, an apparatus includes a near field transducer positioned towards a media-facing surface side, a primary waveguide for delivering light to the near field transducer; a secondary waveguide positioned near the primary waveguide and configured for receiving light from a light source and transferring at least some of the light received thereby to the primary waveguide, and a gap layer positioned between the primary waveguide and the secondary waveguide, wherein the secondary waveguide includes an oxide of at least one of Ta, Ti, Zr, and Nb alloyed with an oxide of at least one of Si and Al.

In another general embodiment, an apparatus includes a near field transducer positioned towards a media-facing surface side, and a primary waveguide for illumination of the near field transducer, the primary waveguide including an oxide of at least one of Ta, Ti, Zr, and Nb alloyed with an oxide of at least one of Si and Al.

In yet another general embodiment, an apparatus includes a near field transducer positioned towards a first side and a primary waveguide for illumination of the near field transducer, the primary waveguide having a first end near a flex side and a second end near the near field transducer. The primary waveguide has a tapered shape such that a cross sectional area of the first end of the primary waveguide is less than a cross sectional area of the second end of the primary waveguide.

Figure 1:
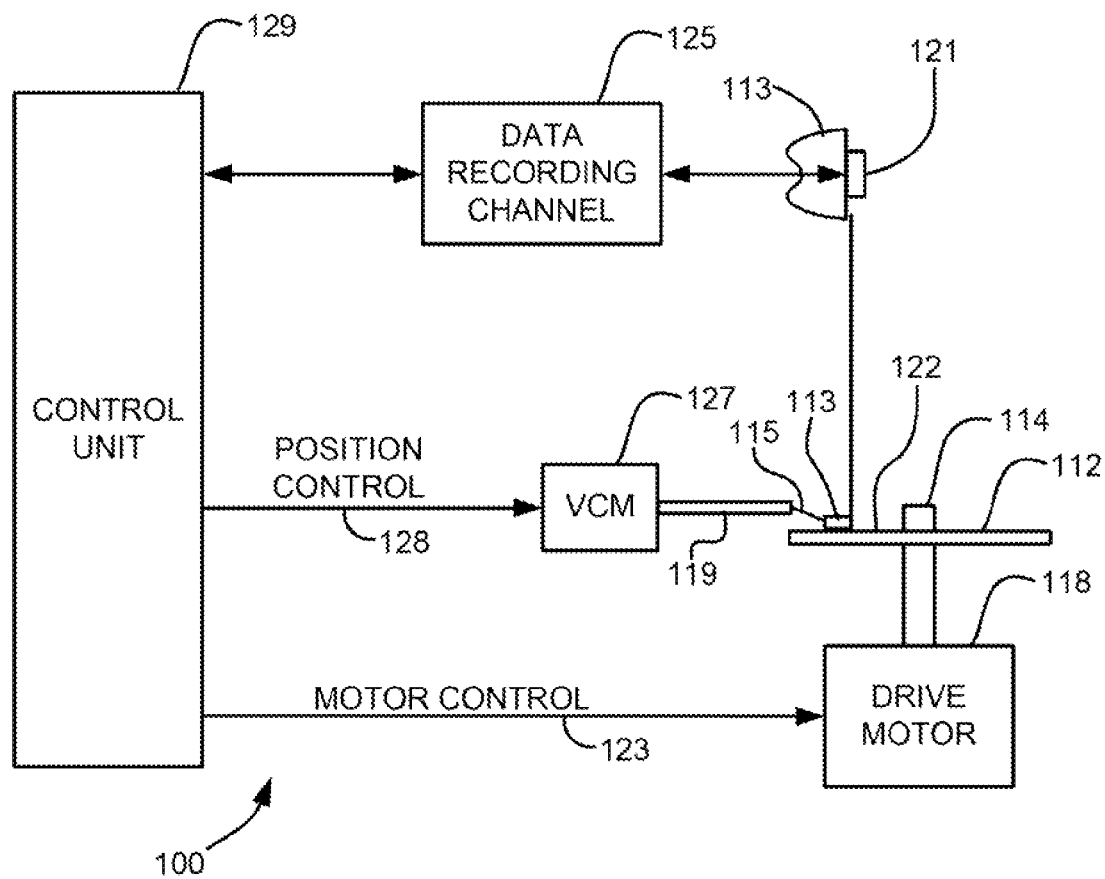
FIG. 1 shows a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 includes logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, includes basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in .FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Thermally assisted recording (TAR) is a method of recording information onto a magnetic recording medium, such as a disk, tape, etc. Various embodiments of the present invention relate to the design of a recessed dielectric waveguide and integration with a near-field optical transducer for TAR. The waveguide core may be optimally recessed by a distance from the transducer and this space may be filled with low index dielectric material leading to significant enhancement of the optical efficiency.

Figure 5A:
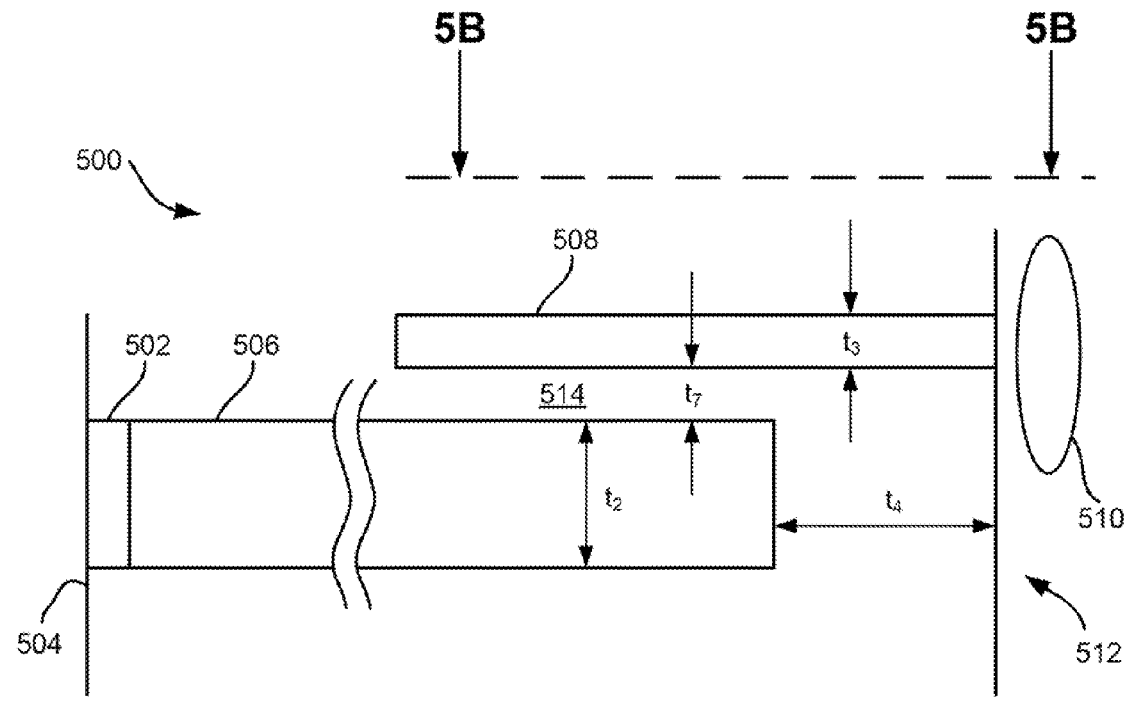
FIG. 5A depicts a partial cross-sectional view of a thermally assisted apparatus according to one embodiment.

Now referring to FIG. 5A, a partial cross section view of a thermally assisted apparatus 500 is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

With continued reference to FIG. 5A, the apparatus 500 includes a near field transducer 502 e.g., of a type known in the art, positioned towards a media-facing surface side 504, such as an air bearing surface side, of a device. In one approach, such a device may include, but is not limited to a magnetic head on a slider. In another approach, the apparatus 500 may include a magnetic head e.g., of a type known in the art, having the near field transducer and a magnetic medium. In one approach, the magnetic medium may be a magnetic tape, a magnetic disk, etc. or any other magnetic medium which would be apparent to one of skill in the art upon reading the present description. The apparatus may additionally include a drive mechanism e.g., of a type known in the art, for passing the magnetic medium over the magnetic head. Furthermore, the apparatus may also incorporate a controller e.g., of a type known in the art electrically coupled to the magnetic head for controlling operation of the magnetic head. In one approach, the electric controller may be electrically coupled to the magnetic head with a wire, wirelessly, etc. or any other electrically coupling configuration which would be apparent to one of skill in the art upon reading the present description.

According to some embodiments, for TAR to be realized, it may be beneficial to confine heat to about a single data track (an exemplary data track may be approximately 40 nm wide or smaller) with high efficiency. illustrative candidate near-field transducers typically use a low-loss metal (Au, Ag, Al, Cu, etc.) shaped in such a way as to concentrate surface charge motion at a tip apex located at a media-facing surface side of the slider when light is incident.

The apparatus 500 may further include a primary waveguide 506 for delivering light to the near field transducer 502. In various approaches, the thickness $t_2$ of the primary waveguide 506 may be between about 300 to about 500 nanometers, but may be smaller or larger based on the approach. In another approach, the primary waveguide 506 may be characterized by t4 being between 0 to about 50 um of separation from the flex side 512.

In one embodiment, the primary waveguide 506 may include an oxide of at least one of Ta, Ti, Zr, and Nb alloyed with an oxide of at least one of Si and Al.

In one embodiment, the primary waveguide may be formed by a process which may include depositing the waveguide material full film and then patterning the layer. The layer then may be milled. Thereafter, a second layer may then be applied full film. The application of the second layer may include a fill step, followed by a polishing step. In other approaches, the primary waveguide may be formed by processes known in the art, or which would be apparent to one of skill in the art upon reading the present description.

In one approach, the primary waveguide may be formed at least in part by co-sputtering the at least one of Ta, Ti, Zr, and Nb and the at least one of Si and Al in the presence of oxygen. In another approach, the primary waveguide may be formed at least in part by sputtering a single target which may include an alloy of the at least one of Ta, Ti, Zr, and Nb and the at least one of Si and Al in the presence of oxygen.

In one embodiment, the sputtering may be conducted in the presence of argon in addition to oxygen.

In one approach, titanium oxide, or niobium oxide may be used in the primary waveguide; each of which may have a refractive index which may or may not be the same value, in the range of about 2.1 to about 2.3, but may be higher or lower based on the approach. For the titanium oxide, the elemental ratio O:Ti may be between about 1.8:1 to about 2.2:1 in order to function desirably as a waveguide, but may be higher or lower based on the approach. For the niobium oxide, the elemental ratio O:Nb may be between about 2.4:1 to about 2.9:1 in order to function desirably as a waveguide, but may be higher or lower based on the preferred approach.

In a preferred approach, tantalum oxide may be used in the primary waveguide and may have a refractive index of about 2.05 to about 2.20, but maybe higher or lower based on the approach. For the tantalum oxide, the elemental ratio O:Ta may be between about 2.4:1 to about 2.9:1 in order to function desirably as a waveguide, but may be higher or lower based on the approach.

In another approach, a silicon oxide alloyed with an oxide of at least one of Ta, Ti, Zr, and Nb may be used in the primary waveguide and may have a refractive index in the range of about 1.47 to about 2.3, depending on the deposition approach and the composition of the final material obtained. In still another approach, an aluminum oxide alloyed with an oxide of at least one of Ta, Ti, Zr, and Nb may be used for the primary waveguide and may have a refractive index in the range of about 1.55 to about 2.3, depending on the deposition approach and the composition of the final material obtained. In a preferred embodiment, the light source may include a laser diode mounted on the flex side 512. It is also preferred that the light from the laser diode is not directly coupled to the primary waveguide 506. The laser diode light spot may measure in the range of about 2 to about 5 microns in diameter; however, the primary waveguide's dimensions are much smaller than this. Therefore, a large amount of the light produced by the laser diode would not be captured by the primary waveguide if exposed thereto, resulting in substantial losses.

Moreover, the spot size of the laser diode cannot be presently reduced to match the mode size of the primary waveguide. Conversely, the size of the primary waveguide cannot be increased to match the spot size of laser diode as the waveguide cross-section area is Critical to efficiently deliver light at the plasmonic transducer to produce nanoscale near-field hot spot primary waveguide. To overcome the foregoing limitations, embodiments which may improve the efficiency of the system incorporates a spot-size converter (SSC). A SSC includes an additional waveguide, which is preferably aligned parallel to the primary waveguide.

With continued reference to FIG. 5A, a SSC includes a secondary waveguide 508 positioned near the primary waveguide 506 and configured to receive light from a light source 510 mounted on the flex side 512. In various approaches, the secondary waveguide 508 may have a thickness $t_3$ in the range of about 50 to about 200 nanometers, but may be smaller or larger based on the approach.

In various embodiments, the secondary waveguide materials composition as well as the synthesis may be configured the same, similar, or different than the configuration of the primary waveguide. Embodiments where the primary waveguide and the secondary waveguide include tantalum oxide and tantalum oxide silica oxide prove to be advantageous in that both the primary and secondary waveguides may be formed in-situ in the same tool, rather than two separate tools.

In a preferred embodiment, the secondary waveguide 508 may include an oxide of at least one of Ta, Ti, Zr, and Nb alloyed with an oxide of at least one of Si and Al. Moreover, the secondary waveguide may be formed by co-sputtering the at least one of Ta, Ti, Zr, and Nb and the at least one of Si and Al in the presence of oxygen. In another embodiment, the secondary waveguide may be formed by sputtering a single target which may include an alloy of the at least one of Ta, Ti, Zr, and Nb and the at least one of Si and Al in the presence of oxygen.

With continued reference to FIG. 5A, the apparatus 500 may also include a thin gap layer 514 that separates the primary waveguide 506 from the secondary waveguide 508. In one approach, the secondary waveguide ideally may be attached to the flex side to collect the light produced from the light source. In another possible approach, the secondary waveguide may be oriented above or below the primary waveguide. The separation layer may include alumina and/or an oxide of at least one of Ta, Ti, Zr, and Nb alloyed with an oxide of at least one of Si and Al. In one approach, the composition of the separation layer may be different than the composition of the secondary waveguide. Thus, in certain approaches, the separation layer and the secondary waveguide may be constructed of different base materials, the same base materials in different ratios, etc. or any other design variation that would be apparent to one skilled in the art for various applications, upon reading the present description. In various other approaches, the primary waveguide may be spaced from the secondary waveguide by a shortest distance $t_7$ between the two of 0 nanometers to about 200 nanometers between facing surfaces thereof. Thus, in some approaches, the primary waveguide and secondary waveguide may be in direct contact, while in others they are spaced apart with the separation layer 514.

In one embodiment, the apparatus 500 may also include a cladding material which at least partially surrounds each of the primary and secondary waveguides, and/or forms a portion thereof. Note that the cladding material associated with the primary waveguide may be the same as or different than the cladding material associated with the secondary waveguide. In one approach, the cladding material may have a refractive index such that the refractive index of the secondary waveguide may be between that of the primary waveguide and the cladding material. In various approaches, the cladding material's composition and/or synthesis may be configured the same, similar, or different than the configuration of the primary waveguide and/or the secondary waveguide.

In a preferred embodiment, the primary waveguide may be primarily (e.g., >90 wt %, more preferably >95 wt %) TaOx, where x may be in the range of about 2.5 to about 2.7. Furthermore, the secondary waveguide may be primarily TaSiOx where the Ta/(Ta+Si) atomic ratio may be in the range of about 0.3 to about 0.7 and x may be in the range of about 2 to about 2.7. Moreover, the thin gap layer and cladding material may be primarily AlOx where x may be in the range of about 1.4 to about 1.7

Without wishing to be bound by any theory, it is believes that another design which may improve the efficiency of the system incorporates a graded waveguide structure. In one embodiment, the primary waveguide may have a graded structure which may include a core, and a cladding portion at least partially surrounding the core where at least one of the core and the cladding has portions of differing refractive indices. In some approaches, a waveguide may only have a core, where in other approaches a cladding and/or other layers may be added.

In one approach, the graded structure may also incorporate an intermediate layer between the core and the cladding portion. In various approaches, the intermediate layer may incorporate an oxide of at least one of Ta, Ti, Zr, and Nb alloyed with an oxide of at least one of Si and Al. According to other approaches, the intermediate layer may include alloyed oxides of different materials. One illustrative embodiment has the following construction: AlOx/TiSiOx/TaOx/TiSiOx/AlOx.

In one approach, the core of the primary waveguide may have a higher index of refraction than the secondary waveguide. In another approach, the core of the primary waveguide may have a higher index of refraction than that of the cladding portion thereof as well as the intermediate layer. In still another approach, the intermediate layer may have a higher index of refraction than that of the cladding portion.

In another approach, the core may also have a higher index of refraction than the cladding portion and the intermediate layer. Additionally, the intermediate layer may have a higher index of refraction than the cladding portion. This design allows for a more efficient method of condensing the light within the corresponding waveguide than a non-graded structure.

Moreover, in another approach, the primary waveguide may not have a graded structure, meaning that it may have a core and a cladding but no intermediate layer of different optical properties than the core or cladding.

Use of the secondary waveguide may allow collection of the maximum amount of light from the light source as possible to improve efficiency. Therefore, it is not necessary that the light be confined within the core of the secondary waveguide 508. In fact, it is preferable that the secondary waveguide 508 has a refractive index difference ($\Delta n$) with the surrounding cladding of value smaller than that for the primary waveguide to ensure that the secondary waveguide has a larger mode size and hence, higher light collection efficiency than the primary waveguide. The dimension of the secondary waveguide is smaller than the mode size and the light that is coupled in the secondary waveguide which travels through the cladding as well as the core, thus increasing light capture from the light source as well as efficiency.

With continued reference to FIG. 5A, the secondary waveguide 508 may also be configured to transfer at least some of the light received thereby to the primary waveguide 506 via evanescent coupling. Without wishing to be bound by any theory, it is believed that when the primary waveguide and the secondary waveguide are oriented in a parallel manner and the distance between the two is preferably as small as possible, most of the light in the secondary waveguide transfers over to the primary waveguide. This event is called evanescent wave coupling. Preferably a majority, and ideally, substantially all of the light captured by the secondary waveguide may be transferred to the primary waveguide.

Figure 5B:
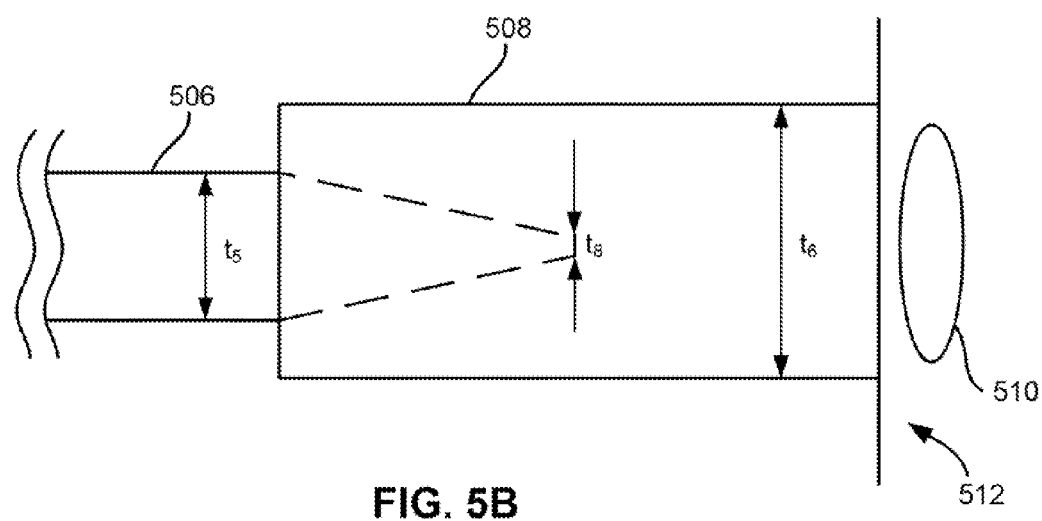
FIG. 5B depicts a partial top-down view of a thermally assisted apparatus according to one embodiment.

It is also believed that the mode size of the two waveguides may affect the amount of light that may be transferred, and could improve the evanescence coupling of the waveguides. It is believed that the mode size is proportional to the geometry of the waveguide. Referring now to FIG. 5B, in one embodiment, the primary waveguide 506 may have a tapered-top-down profile, where the sides of the primary waveguide 506 may taper together towards an end of the primary waveguide 506 positioned farthest from the near field transducer 502. In one approach, the tapered waveguide may come to a pointed tip, a small flat end (as shown), a small rounded end, etc. The width $t_8$ of the end of the primary waveguide may be in the range of 0 to about 150 nm, but may be higher based on the desired application.

The primary waveguide 506 may have a widest point represented by $t_5$ which may be about 300 nanometers to about 1 micrometer, but it may be smaller or larger based on the approach. Moreover, in one approach, the secondary waveguide 508 may be characterized by $t_6$ being between about 1 to about 5 micrometers, but may be smaller or larger based on the desired approach.

Again without wishing to be bound by any theory, it is believed that by reducing the area of the primary waveguide, the mode size of the primary waveguide is being increased. Moreover, the tapered shape thereof as seen in FIG. 5B provides a gradually sweeping range of mode size values for the primary waveguide. Furthermore, it is believed that when the mode sizes of the secondary and primary waveguides are similar, an even greater amount of the light in the secondary waveguide is transferred to the primary waveguide. Based on the design, at one area of the gradually tapered primary waveguide, the mode size is about the same or similar to that of the secondary waveguide, allowing for an improved evanescent coupling.

It is believed that evanescent coupling allows for a higher percentage of the light coming from a light source to be captured by a secondary waveguide, whereupon it is transferred to the primary waveguide and effectively focused within the core allowing for a more accurate structure. Therefore, the amount of light captured is greatly increased.

In one embodiment, the graded structure may further include a separation layer between the primary waveguide and the secondary waveguide. Again without wishing to be bound by any theory, it is believed that the separation layer may be designed to increase the amount of the light captured by the secondary waveguide, which is transferred into the primary waveguide. Preferably, the refractive index of the separation layer may be tuned as to increase the amount of light transferred from the secondary waveguide to the primary waveguide. Tuning of the refractive index may be done by making changes to the ratios of the materials used in each respective layer.

Figure 6:
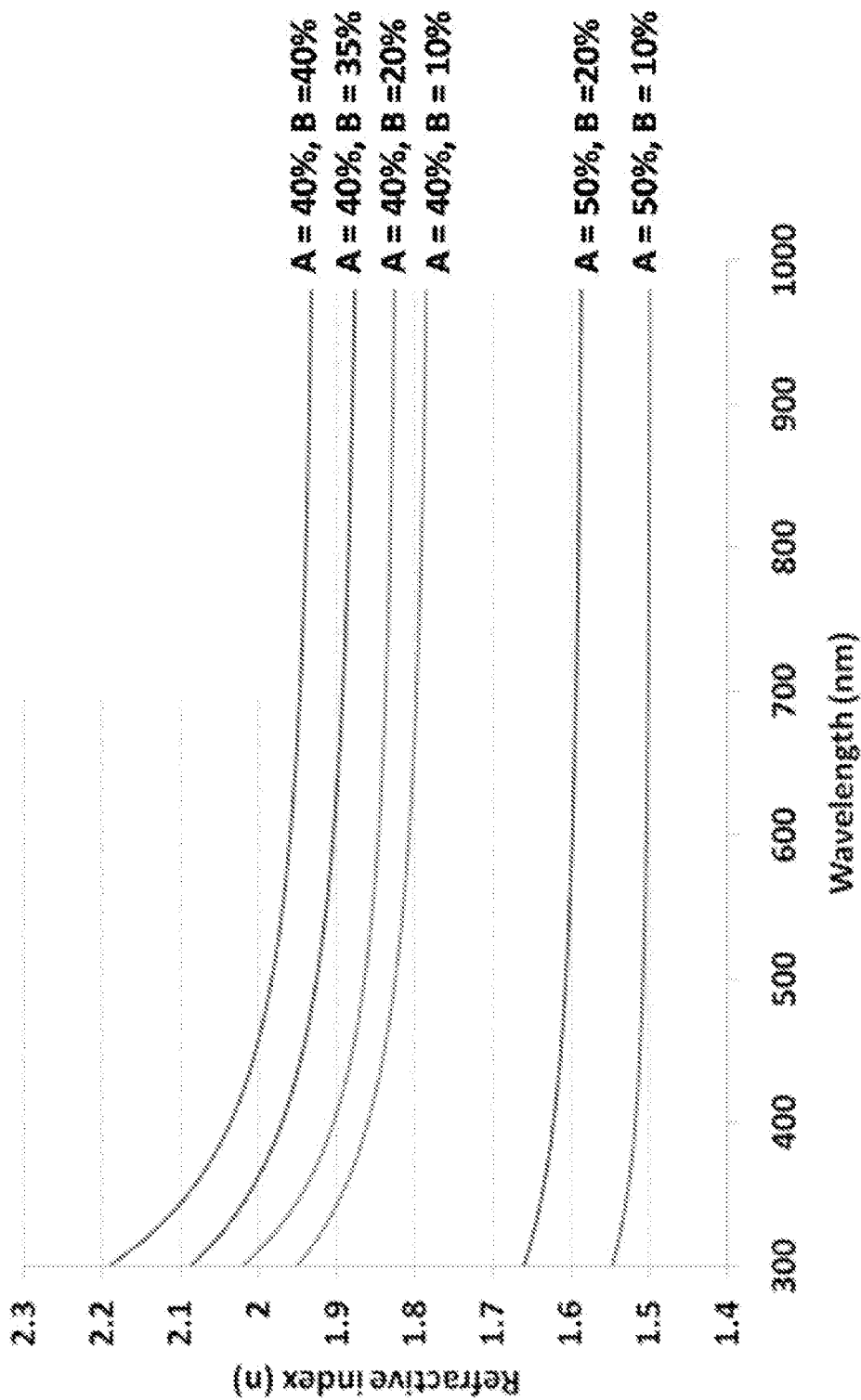
FIG. 6 depicts an experimental measurement of refractive index tuning achieved by mixing two different oxide materials, material A and material B.

Referring to FIG. 6, a graph is shown depicting the tuning of the refractive index of a composite oxide embodiment. By varying the ratios of two different oxides A, B under different co-sputter conditions, it is apparent that the refractive index may be altered based on the desired approach. The ability to tune the refractive index of a material can be very useful in many applications such as hard drives.

In one approach, the separation layer may incorporate an oxide of at least one of Ta, Ti, Zr and Nb alloyed with an oxide of at least one of Si and Al. Moreover, the separation layer may include the same materials as one or both of the waveguides; however in different ratios to help transfer the light from the secondary waveguide to the primary waveguide. According to other approaches, the intermediate layer may include alloyed oxides of different materials.

Figure 7A:
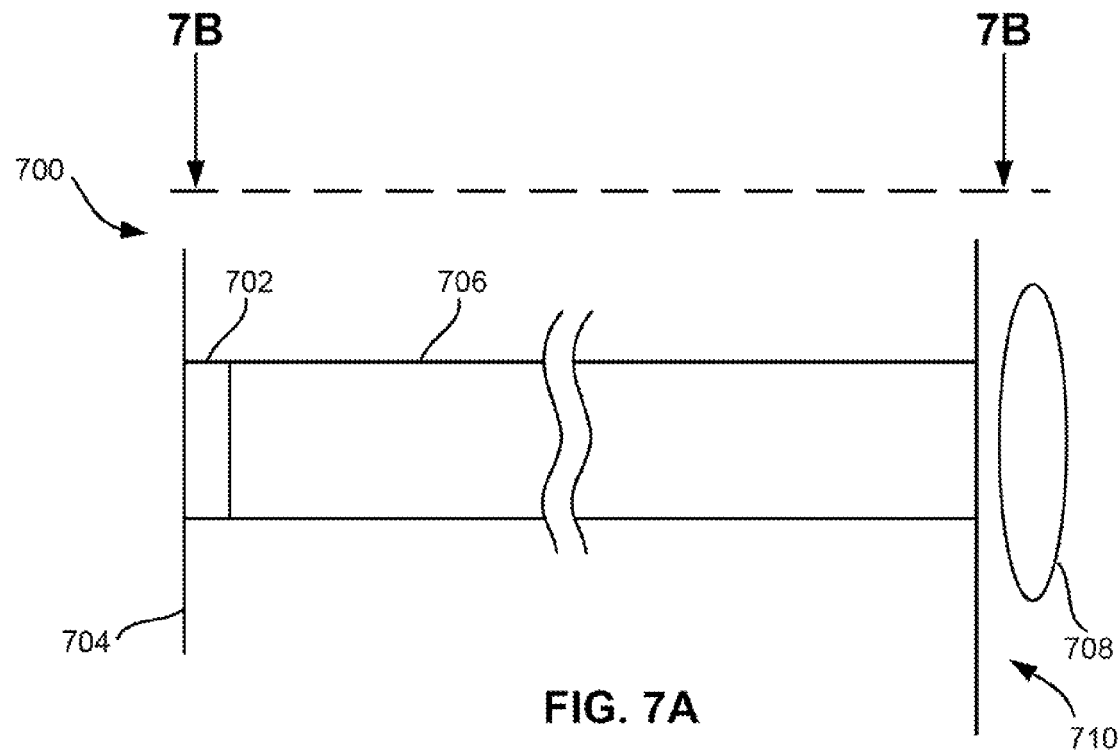
FIG. 7A depicts a partial cross-section view of a thermally assisted apparatus according to one embodiment.

Now referring to FIG. 7A, a partial cross section view of a thermally assisted apparatus 700 is shown according to another embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

With continued reference to FIG. 7A, the apparatus 700 includes a near field transducer 702 positioned towards a media-facing side 704 of the apparatus 700. In one approach, a primary waveguide 706 may be included for delivering light to the near field transducer 702. The primary waveguide 706 may additionally incorporate an oxide of at least one of Ta, Ti, Zr and Nb alloyed with an oxide of at least one of Si and Al.

In one approach, the primary waveguide 706 may be exposed directly to light from a light source 708 at a flex side 710 thereof. The flex side 710 may be described as being located at an end of the primary waveguide 706 that is opposite the end of the primary waveguide 706 that is closest to the near field transducer 702, in one approach.

Figure 7B:
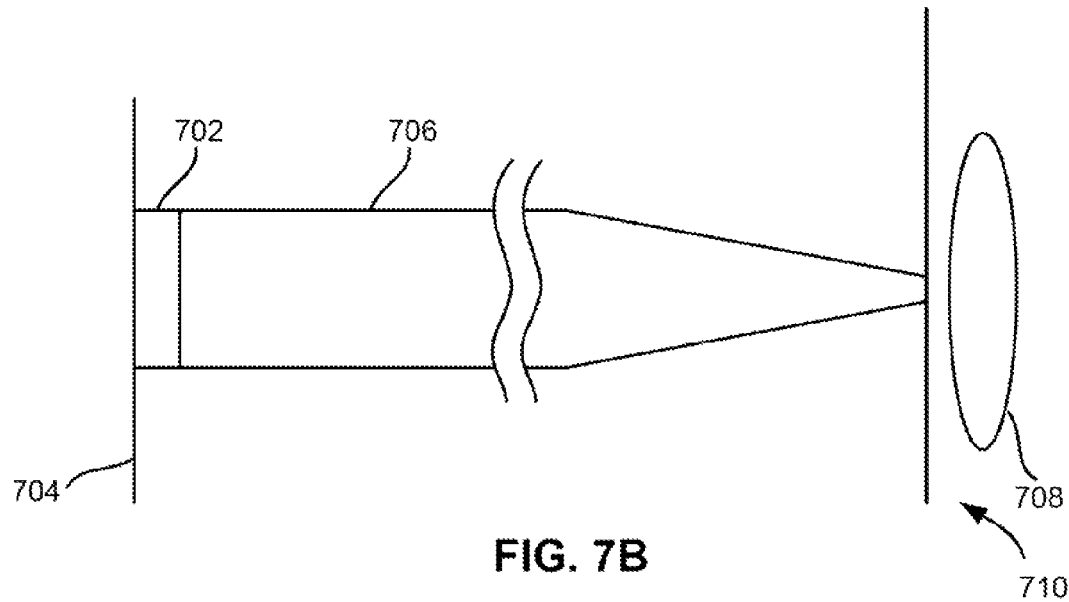
FIG. 7B depicts a partial top-down view of thermally assisted apparatus according to one embodiment.

Again without wishing to be bound by any theory, it is believed that by reducing the cross sectional area of the primary waveguide 706 at the flex side 710, the effective mode size of the primary waveguide 706 is increased. The tapered shape of the primary waveguide 706 as seen in FIG. 7B increases the light coupling efficiency from the laser diode 708 to the primary waveguide 706, thereby, increasing the amount of light that is delivered at the plasmonic transducer (near field transducer 702).

In one such embodiment, the primary waveguide 706 may have a tapered shape such that a cross sectional area of the primary waveguide 706 near the flex side 710 is less than a cross sectional area of the primary waveguide 706 near the near field transducer 702. In more approaches, multiple waveguides may be positioned between the light source 708 and the near field transducer 702, with the cross sectional area of the multiple waveguides near the light source 708 being less than the cross sectional area of the multiple waveguides near the near field transducer 702.

In another embodiment, an apparatus 700 comprises a near field transducer 702 positioned towards a first side 704 and a primary waveguide 706 for illumination of the near field transducer 702, the primary waveguide 706 having a first end near a flex side 710 and a second end near the near field transducer 702. In one embodiment, the first side 704 may be a media-facing surface side, an air bearing surface side, a light emitting side, etc., of the apparatus 700. The primary waveguide 706 has a tapered shape such that a cross sectional area of the first end of the primary waveguide 706 is less than a cross sectional area of the second end of the primary waveguide 706, which may increase the light coupling efficiency from a light source 708, such as a laser diode, to the primary waveguide 706, such as a plasmonic transducer, thereby increasing the amount of light that is delivered at the near field transducer 702.

Of course, any of the embodiments and/or approaches described herein may be included in the descriptions of apparatus 700 in regards to FIG. 7.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a near field transducer positioned towards a media-facing surface side;
a primary waveguide for delivering light to the near field transducer;
a secondary waveguide positioned near the primary waveguide and configured for receiving light from a light source and transferring at least some of the light received thereby to the primary waveguide; and
a gap layer positioned between the primary waveguide and the secondary waveguide;
wherein the secondary waveguide comprises an oxide of at least one of Ta, Ti, Zr, and Nb alloyed with an oxide of at least one of Si and Al.

2. The apparatus as recited in claim 1, further comprising a cladding material that at least partially surrounds each of the primary and secondary waveguides, wherein the primary waveguide is primarily $TaO_x$, where x is in a range of 2.5 to 2.7; wherein the second waveguide is primarily $TaSiO_x$ where a Ta/(Ta+Si) atomic ratio thereof is in a range of 0.3 to 0.7 and x is in a range of 2 to 2.7; wherein the thin gap layer and cladding material are both primarily $AlO_x$ where x is in the range of 1.4-1.7.

3. The apparatus as recited in claim 1, wherein the primary waveguide is not exposed directly to light from the light source.

4. The apparatus as recited in claim 1, wherein the primary waveguide has a tapered cross sectional profile, sides of the primary waveguide tapering together towards an end of the primary waveguide positioned farthest from the near field transducer.

5. The apparatus as recited in claim 1, wherein a core of the primary waveguide has a higher index of refraction than the secondary waveguide.

6. The apparatus as recited in claim 1, wherein the primary waveguide is spaced from the secondary waveguide by between 0 nanometers and about 200 nanometers.

7. The apparatus as recited in claim 1, further comprising a separation layer between the primary waveguide and the secondary waveguide, wherein the separation layer comprises $AlO_x$ or an oxide of at least one of Ta, Ti, Zr and Nb alloyed with an oxide of at least one of Si and Al.

8. The apparatus as recited in claim 7, wherein the separation layer comprises the oxide of at least one of Ta, Ti, Zr and NU alloyed with the oxide of at least one of Si and Al, wherein a composition of the separation layer is different than the composition of the secondary waveguide.

9. The apparatus as recited in claim 7, wherein the primary waveguide does not have a graded structure.

10. The apparatus as recited in claim 1, wherein the primary waveguide includes a core, a cladding portion at least partially surrounding the core, and an intermediate layer between the core and the cladding portion, the intermediate layer comprising an oxide of at least one of Ta, Ti, Zr and Nb alloyed with an oxide of at least one of Si and Al, wherein the core has a higher index of refraction than the cladding portion and the intermediate layer, wherein the intermediate layer has a higher index of refraction than the cladding portion.

11. The apparatus as recited in claim 10, further comprising a separation layer between the primary waveguide and the secondary waveguide, wherein the separation layer comprises an oxide of at least one of Ta, Ti, Zr and Nb alloyed with an oxide of at least one of Si and Al.

12. The apparatus as recited in claim 1, further comprising:
a magnetic head having the near field transducer;
a magnetic medium;
a drive mechanism for passing the magnetic medium over the magnetic head;
and a controller electrically coupled to the magnetic head for controlling operation of the magnetic head.

13. A method for forming the apparatus as recited in claim 1, wherein the secondary waveguide is formed by co-sputtering the at least one of Ta, Ti, Zr and Nb and the at least one of Si and Al in the presence of oxygen.

14. A method for forming the apparatus as recited in claim 1, wherein the secondary waveguide is formed by sputtering a single target comprising an alloy of the at least one of Ta, Ti, Zr and Nb and the at least one of Si and Al in the presence of oxygen.

15. A method for forming the apparatus as recited in claim 1, wherein the primary waveguide comprises an oxide of at least one of Ta, Ti, Zr and Nb alloyed with an oxide of at least one of Si and Al, wherein the primary waveguide is formed at least in part by co-sputtering the at least one of Ta, Ti, Zr and Nb and the at least one of Si and Al in the presence of oxygen.

16. A method for forming the apparatus as recited in claim 1, wherein the primary waveguide comprises an oxide of at least one of Ta, Ti, Zr and Nb alloyed with an oxide of at least one of Si and Al, wherein the primary waveguide is formed at least in part by sputtering a single target comprising an alloy of the at least one of Ta, Ti, Zr and Nb and the at least one of Si and Al in the presence of oxygen.

17. An apparatus, comprising:
a near field transducer positioned towards a media-facing surface side; and
a primary waveguide for illumination of the near field transducer, the primary waveguide comprising an oxide of at least one of Ta, Ti, Zr and Nb alloyed with an oxide of at least one of Si and Al.

18. The apparatus as recited in claim 17, wherein the primary waveguide is exposed on a flex side thereof directly to light from a light source.

19. The apparatus as recited in claim 18, wherein the primary waveguide does not have a graded structure.

20. The apparatus as recited in claim 18, wherein the primary waveguide has a tapered shape such that a cross sectional area of the primary waveguide near the flex side is less than a cross sectional area of the primary waveguide near the near field transducer.

21. The apparatus as recited in claim 17, wherein the primary waveguide includes a core, a cladding portion at least partially surrounding the core, and an intermediate layer between the core and the cladding portion, the intermediate layer comprising an oxide of at least one of Ta, Ti, Zr and Nb alloyed with an oxide of at least one of Si and Al, wherein the core has a higher index of refraction than the cladding portion and the intermediate layer, wherein the intermediate layer has a higher index of refraction than the cladding portion.

22. The apparatus as recited in claim 17, further comprising:
a magnetic head having the near field transducer;
a magnetic medium;
a drive mechanism for passing the magnetic medium over the magnetic head;
and a controller electrically coupled to the magnetic head for controlling operation of the magnetic head.

23. A method for forming the apparatus as recited in claim 17, wherein the primary waveguide is formed by co-sputtering the at least one of Ta, Ti, Zr and Nb and the at least one of Si and Al in the presence of oxygen.

24. A method for forming the apparatus as recited in claim 17, wherein the primary waveguide is formed by sputtering a single target comprising an alloy of the at least one of Ta, Ti, Zr and Nb and the at least one of Si and Al in the presence of oxygen.

25. An apparatus, comprising:
a near field transducer positioned towards a first side; and
a primary waveguide for illumination of the near field transducer, the primary waveguide having a first end near a flex side and a second end near the near field transducer,
wherein the primary waveguide has a tapered shape such that a cross sectional area of the first end of the primary waveguide is less than a cross sectional area of the second end of the primary waveguide;
wherein the primary waveguide comprises an oxide of at least one of Ta, Ti, Zr, and Nb alloyed with an oxide of at least one of Si and Al.

* * * * *

UNITED STATES PATENT AND TRADEMARK OFFICE
CERTIFICATE OF CORRECTION

| | | |
|---|---|---|
| PATENT NO. | : 8,760,978 B2 | Page 1 of 1 |
| APPLICATION NO. | : 13/311397 | |
| DATED | : June 24, 2014 | |
| INVENTOR(S) | : Rawat | |

It is certified that error appears in the above-identified patent and that said Letters Patent is hereby corrected as shown below:

In the specification:

col. 2, line 8 replace "NU" with --Nb--;

col. 3, line 21 replace "meaning" with --meanings--;

col. 7, line 4 replace "illustrative" with --Illustrative--;

col. 7, line 51 replace "maybe" with --may be--;

col. 8, line 12 replace "Critical" with --critical--.

In the claims:

col. 12, line 65, claim 8 replace "NU" with --Nb--.

Signed and Sealed this
Seventh Day of October, 2014

Michelle K. Lee
*Deputy Director of the United States Patent and Trademark Office*